United States Patent [19]

Reed et al.

[11] 4,372,786
[45] Feb. 8, 1983

[54] STABILIZING CLAY SOIL WITH CHEMICAL SOLUTIONS

[75] Inventors: Marion G. Reed, Hacienda Height; Tor Loken; Odd R. Bryhn, both of Oslo, Norway

[73] Assignee: Chevron Research Company, San Francisco, Calif.

[21] Appl. No.: 281,799

[22] Filed: Jul. 9, 1981

[51] Int. Cl.³ ............................................... C09K 3/00
[52] U.S. Cl. .................................... 106/900; 166/292
[58] Field of Search .................. 405/264; 106/900; 166/292; 404/75, 76

[56] References Cited

U.S. PATENT DOCUMENTS

| | | | |
|---|---|---|---|
| 3,382,924 | 5/1968 | Veley et al. | 166/42 |
| 3,543,858 | 12/1970 | Nooner | 166/303 |
| 3,603,399 | 9/1971 | Reed | 166/292 |
| 3,827,495 | 8/1974 | Reed | 166/281 |
| 4,136,992 | 1/1979 | Olsson | 404/108 |

OTHER PUBLICATIONS

Veley, "How Hydrolyzable Metal Ions Stabilize Clays to Prevent Permeability Reduction," Society of Petroleum Eng., Oct, 2, 1988, pp. 1-11.
Veley "How Hydrolyzable Metal Ions React with Clays to Control Formation Water Sensitivity" JPT, Sep., 1969, pp. 1111-1117.
Hsu et al., "Fixation of Hydroxy-Aluminum Polymers by Vermiculite," Soil Science Society of America Proceedings, vol. 28, No. 6, Nov.-Dec. 1964, pp. 763-769.
Schwertmann et al. "Influence of Hydroxy Aluminum Ions on pH Titration Curves of Hydronium-Aluminum Clays," Soil Sci. Pro., 1964 Mar.-Apr., pp. 179-184.
Linden-Alimak—"Construction Bulletn" Jan. 80, pp. 1-6.

*Primary Examiner*—Theodore Morris
*Attorney, Agent, or Firm*—Edward J. Keeling; D. A. Newell

[57] ABSTRACT

A method of stabilizing clay soil comprising admixing the clay soil with an effective amount of a solution of chemicals comprising hydroxy-aluminum and a chemical selected from the group consisting of potassium chloride, potassium nitrate, potassium sulfate, ammonium chloride, ammonium nitrate, and ammonium sulfate.

10 Claims, 14 Drawing Figures

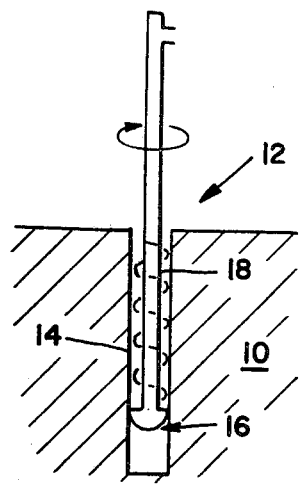
FIG_1
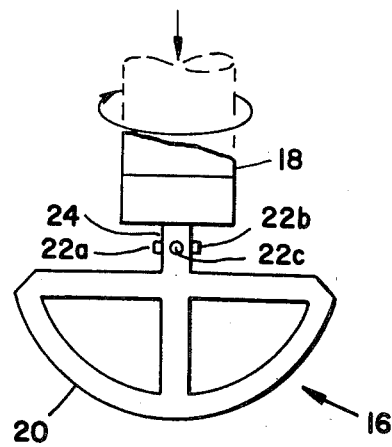
FIG_2
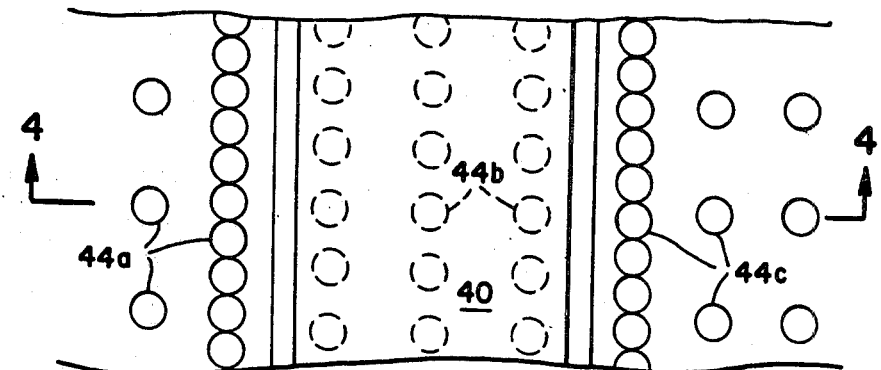
FIG_3
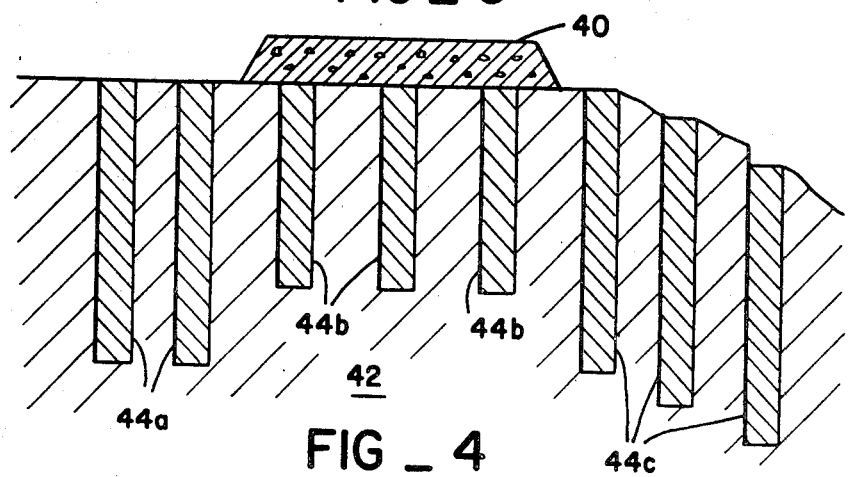
FIG_4

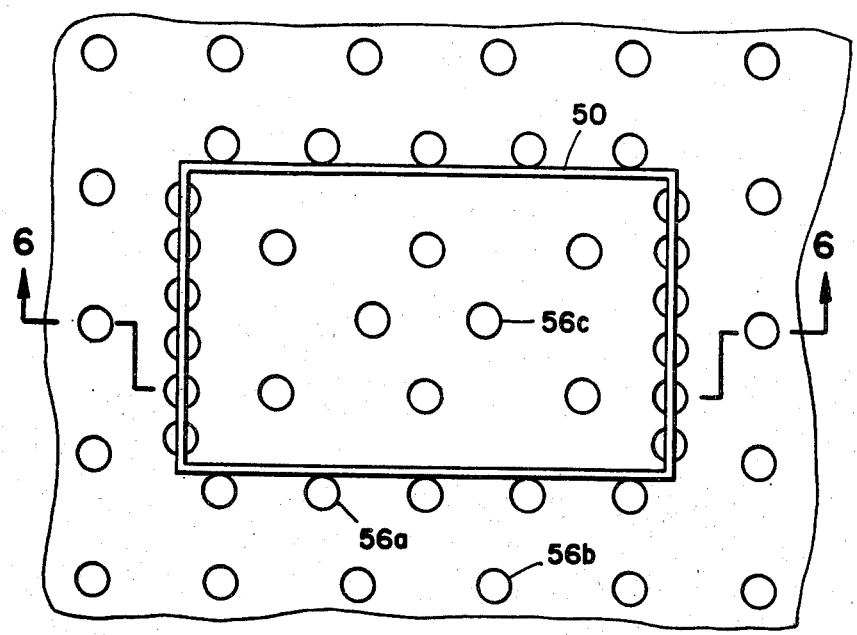
FIG _ 5
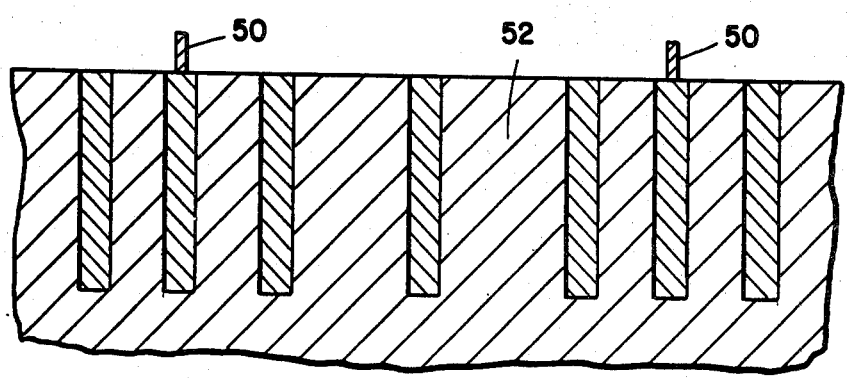
FIG _ 6
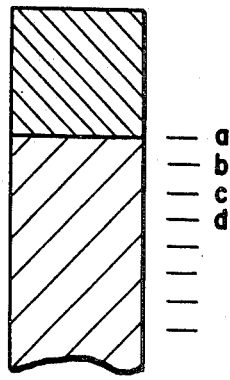
FIG _ 7

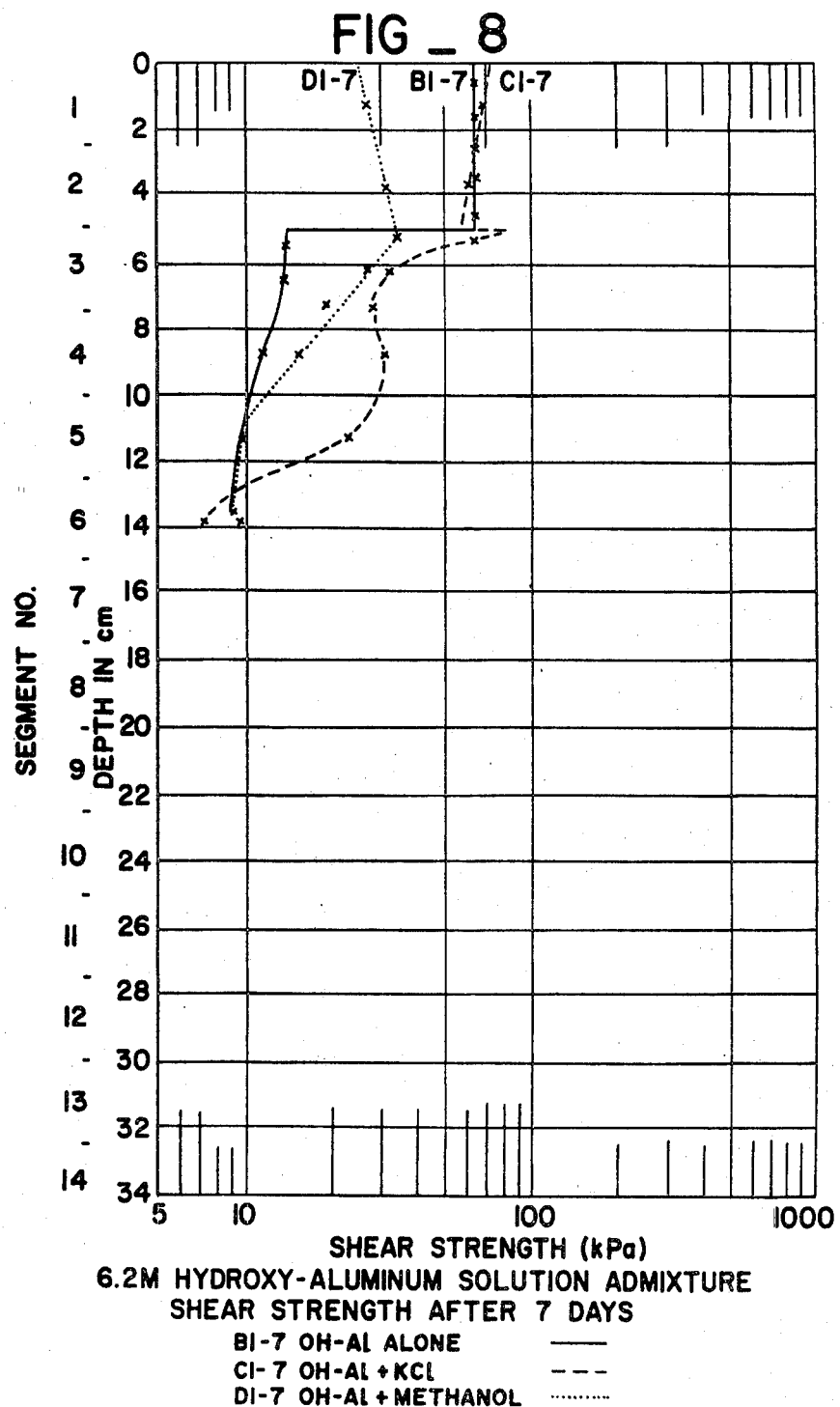

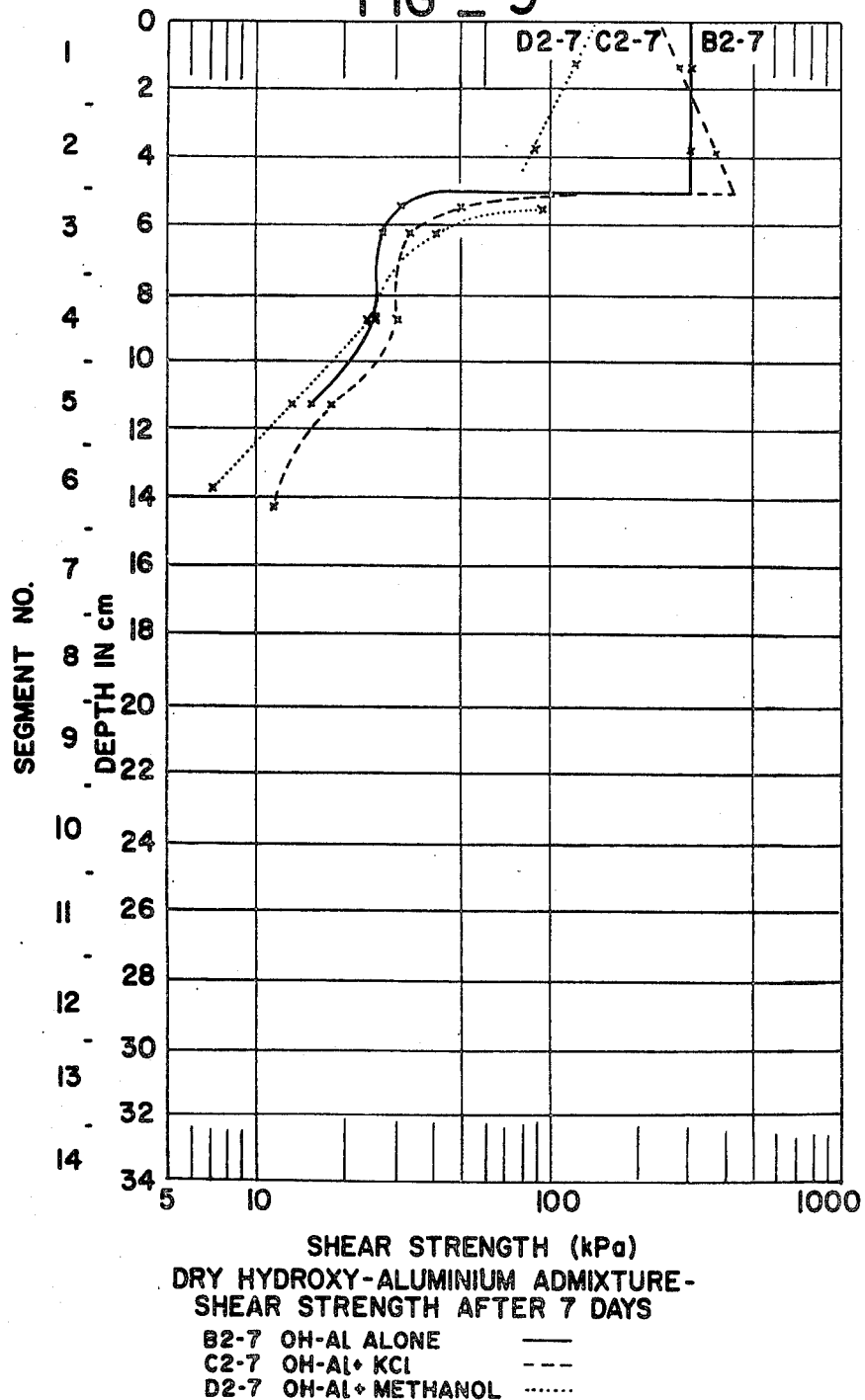

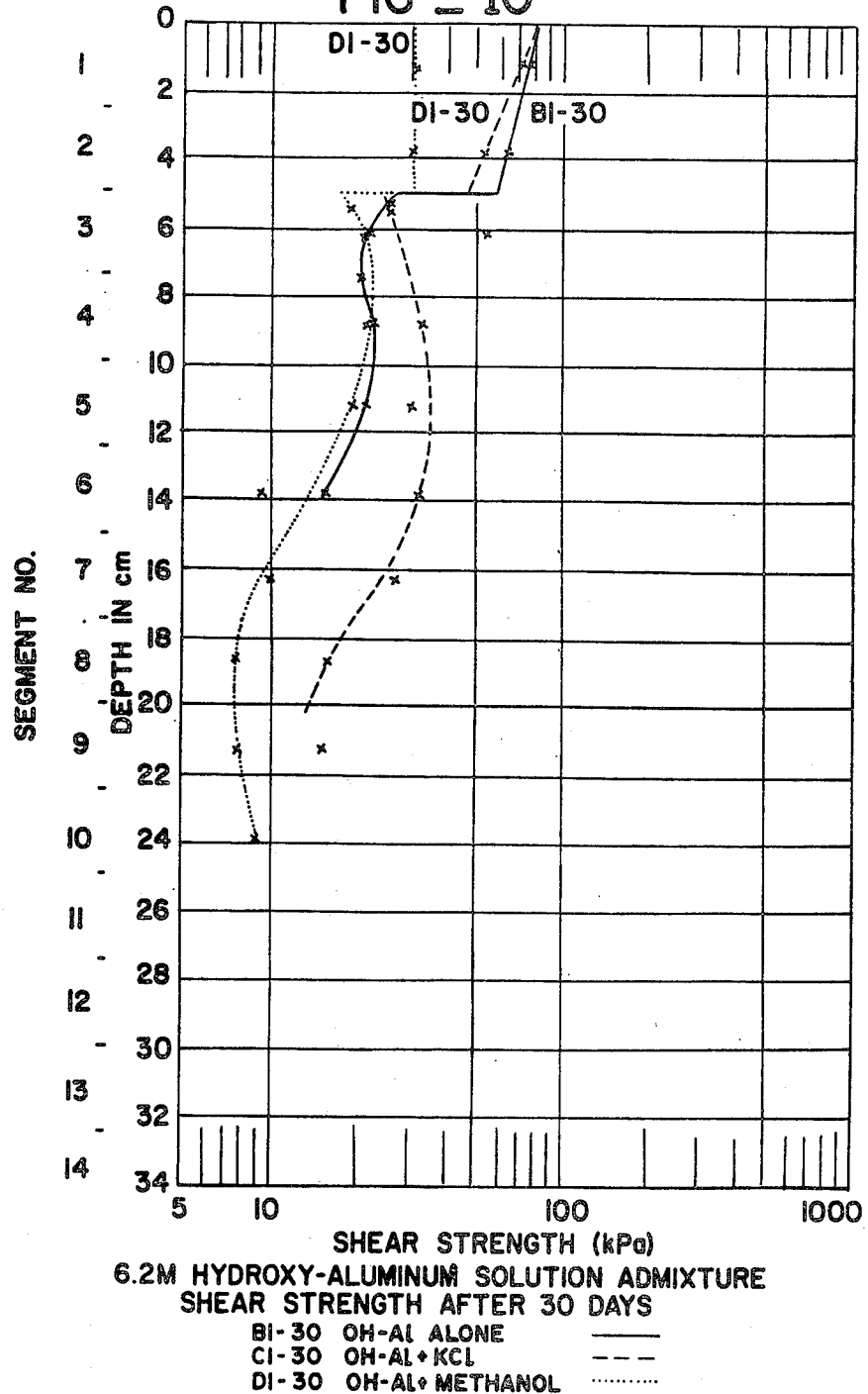

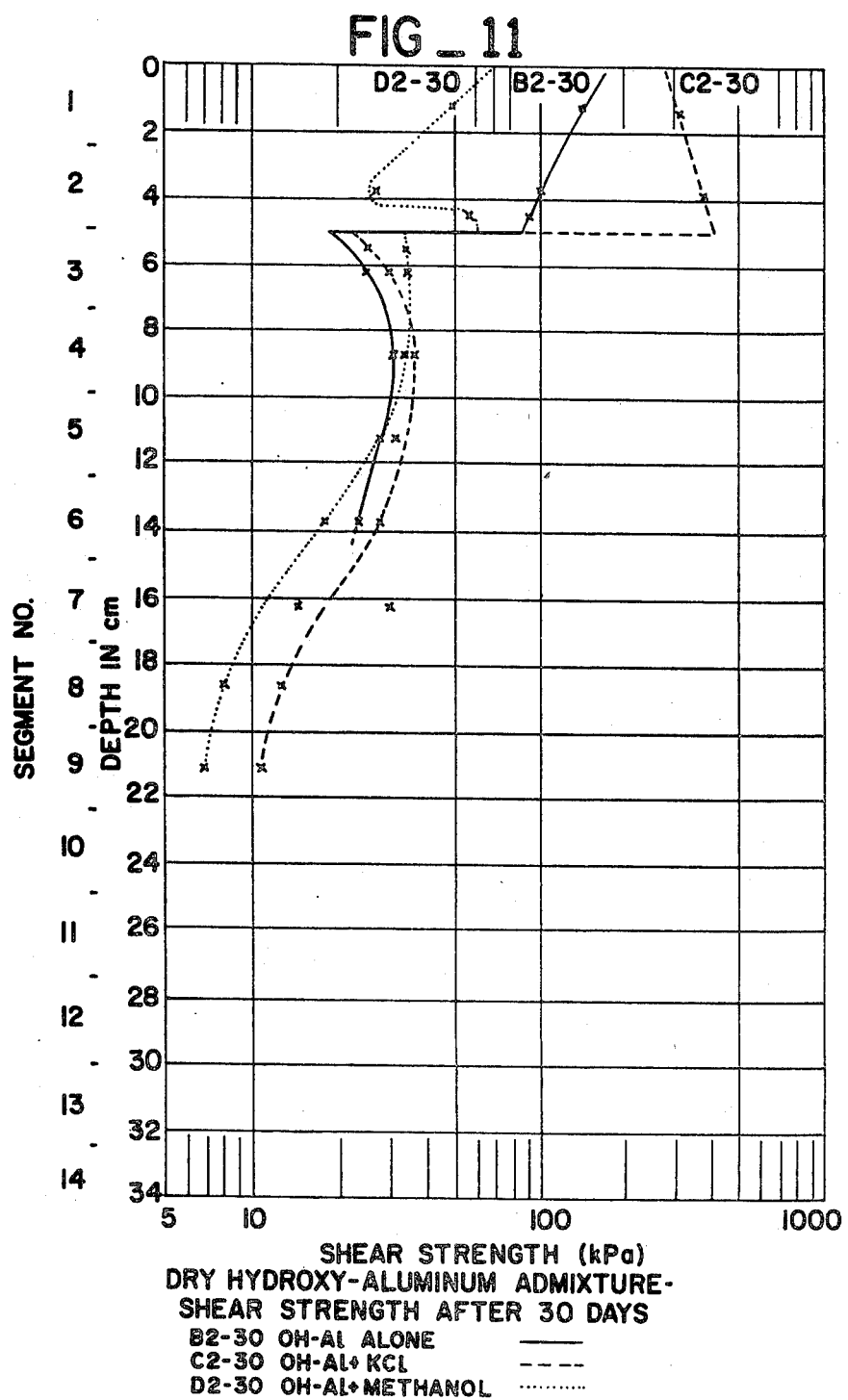

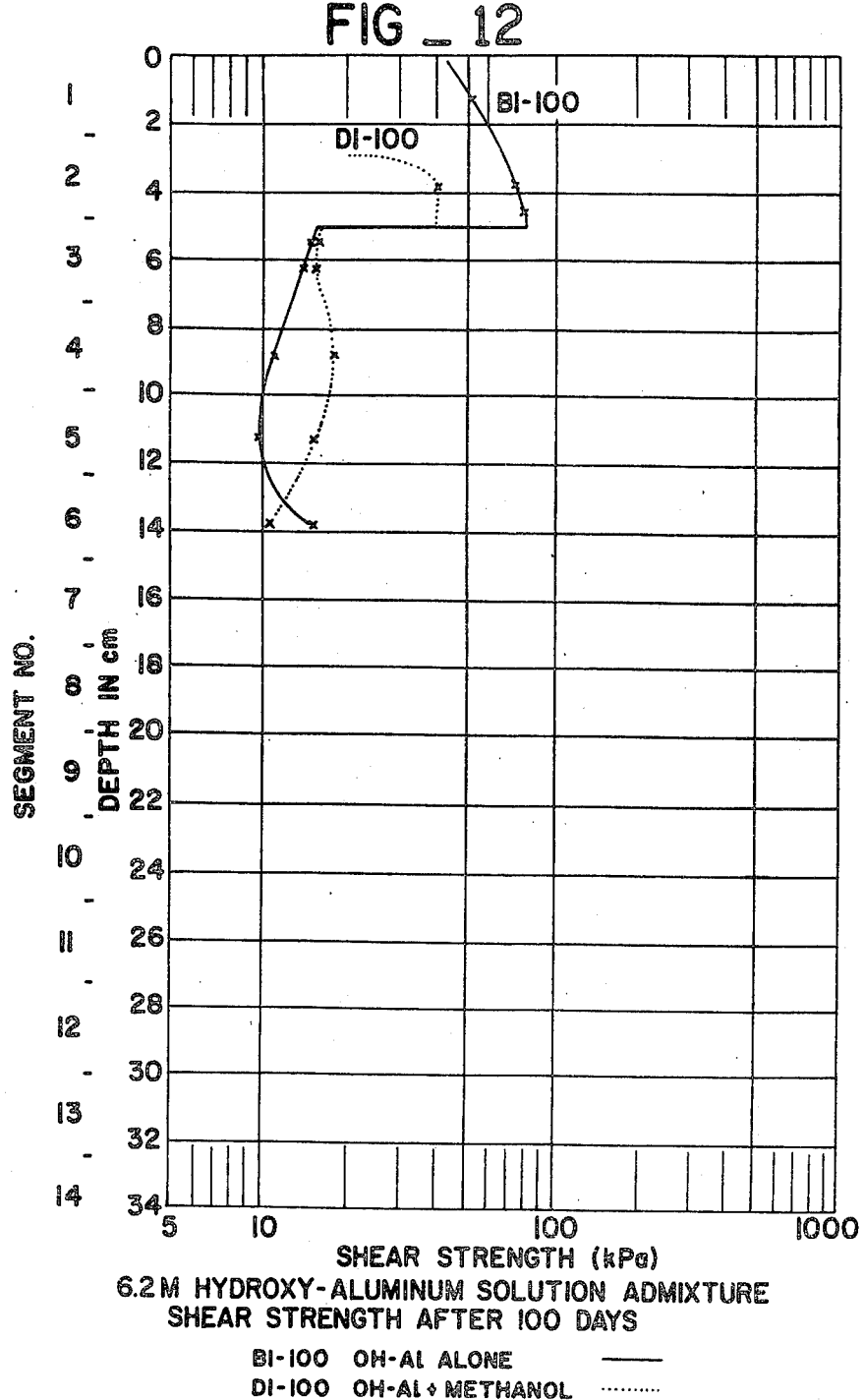

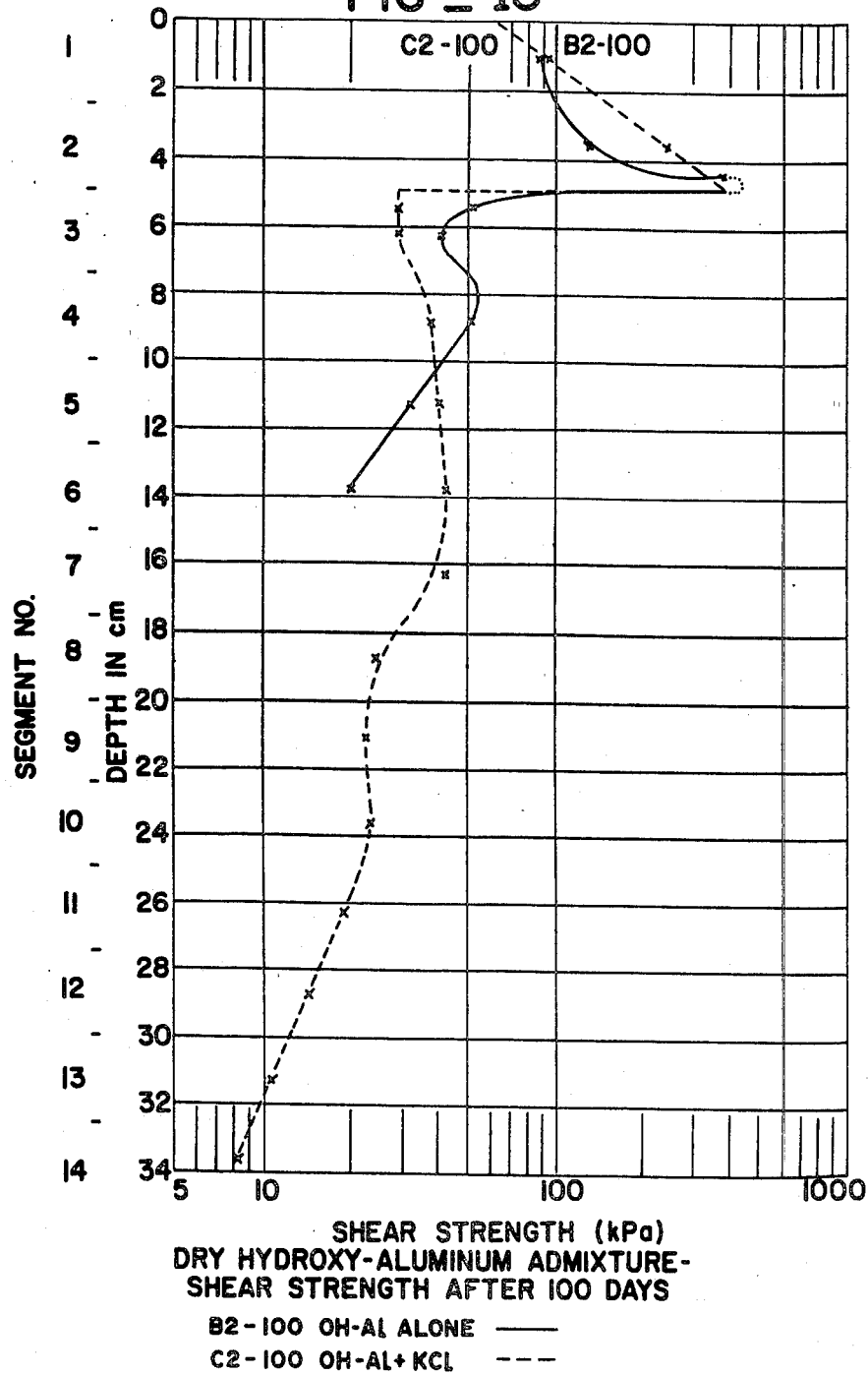

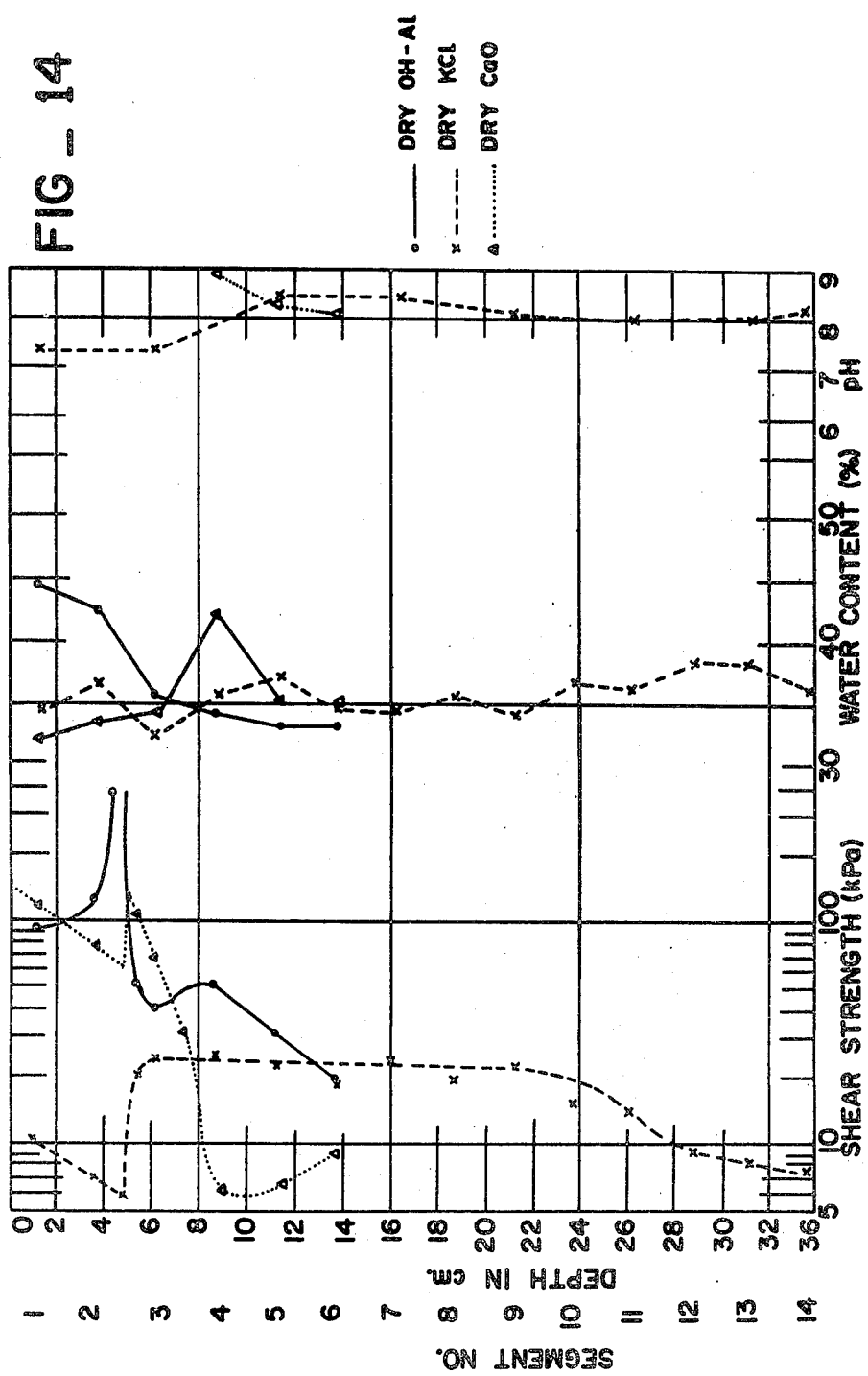

STABILIZING CLAY SOIL WITH CHEMICAL SOLUTIONS

RELATED APPLICATIONS

This application is related to applications Ser. No. 281,750, by Marion G. Reed; Ser. Nos. 281,751 and 281,752, both by Tor Loken et al.; all filed on July 9, 1981.

BACKGROUND OF THE INVENTION

Many clay deposits often need to be stabilized before they can carry any additional load such as is applied during filling and construction activities. This is specially true for the so-called quick clays which frequently are found, for example, in northern Soviet Union, Scandinavia, Canada, upper New York State, and New Zealand. Clays were originally deposited in marine and brackish water in a short period after the last glaciation, and later during the continental (isostatic) uplift were raised above sea level. However, only certain of these clay deposits were subsequently changed into sensitive quick clays. Two processes are mainly responsible for such a change. The original pore water salt content of the clay may have been leached by percolating ground water, or organic matter from logs or marshes which will act as dispersing agents may have been introduced into the clay. The first process has been most important in clays found in Norway, while quick clays containing high organic content formed by the second process are frequently found in Sweden and Canada.

The quick clays will in the undisturbed state exhibit a certain limited strength, but will upon remoulding completely liquefy. This same phenomena has caused several quick clay slides in the lowlands of eastern and middle Norway, often with catastrophic consequences. Heretofore, several chemical stabilization schemes have been tried for such clays. Among them were aluminum chloride ($AlCl_3$) and potassium chloride (KCl). The quick clays have been stabilized in two ways. The clay can be mixed and remoulded with the chemicals, or the chemicals can be allowed to diffuse into the undisturbed quick clay. The disadvantage of the salt diffusion method is the long time it takes to reach the required penetration. The diffusion method has been applied only once, so far as is known, in full scale in the field, when salt wells containing KCl were installed two years prior to a major highway construction.

Heretofore, a method for deep stabilization with unslacked lime (CaO) was developed. Lime is an old stabilizing agent that has been used occasionally. In China it was used centuries ago as a construction material. In the U.S.A. in the 1940's and Europe in the 1950's lime was used as a surface stabilizing agent. The deep stabilization method involves mixing and molding the lime with the clay to form a series of piles which extend down into the clay. These piles provide lateral stabilization to the clay deposit.

Both the lime and potassium chloride methods have some disadvantages. KCl will stabilize the undisturbed circumjacent clay, but not the disturbed clay. Furthermore, CaO makes an unhomogenous stabilization. Pockets of lime cause brittle cylinders with small sideways shear strength. In addition, CaO is not useful on clays with high water content. While hydroxy-aluminum as $Al(OH)_{2.5}Cl_{0.5}$ has not been used as a clay stabilizing agent in foundation engineering before it has been applied as a cementing agent in preparing desired clay microstructures for laboratory studies. Hydroxy-aluminum solution containing KCl has also been used in wells to treat water sensitive clay containing formations and to provide sand stabilization. Relatively dilute solutions and overflushes are commonly used in the field. These methods are disclosed in U.S. Pat. Nos. 3,603,399 issued Sept. 7, 1971 and 3,827,495 issued Aug. 6, 1974 both to Marion G. Reed as assignor to Chevron Research Company.

In summary, there is still need for a method of stabilizing clay soil with chemicals that provides lasting and effective stabilization for clay deposits.

BRIEF DESCRIPTION OF THE INVENTION

The present invention provides for stabilizing clay soil by admixing an effective amount of a solution, preferably of hydroxy-aluminum and potassium chloride with the clay. While potassium chloride is preferred, other chemicals useful in place of potassium chloride include potassium nitrate, potassium sulfate, ammonium chloride, ammonium nitrate and ammonium sulfate. The admixture is preferably done in a manner so that the stabilized clay forms a series of piles which extend into the clay deposit at spaced apart location to provide stability for the entire clay containing deposit. The desired size, location and number of the piles are determined. An effective amount of a solution of hydroxy-aluminum and potassium chloride is admixed with the clay in place in each location in the deposit to react with the clay and thereby form the desired piles.

An effective amount means that enough hydroxy-aluminum is present to saturate the clay and to gel the water in or added to the clay by the solution. This usually requires that at least about 5 ml of hydroxy-aluminum solution of at least 4 molar concentration per 100 grams clay soil wet weight be used to get some benefits of the present invention. It is noted, however, that clays might be encountered where somewhat less hydroxy-aluminum solution will be effective. In preferred form the hydroxy-aluminum solution should be at least 6 molar concentration. It is highly preferred that the hydroxy-aluminum solution be as concentrated as possible without causing premature gelling. Thus, concentrations of 8 to 10 molar are often highly preferred. The potassium chloride is useful in diffusing into the undisturbed clay and should be present in sufficient amount to accomplish the desired diffusion. This is also generally at least 4 molar and often it is desirable to use higher concentrations of potassium chloride.

Typically, the size, i.e. the volume of a desired pile to be formed in the clay containing deposit, is determined and the wet weight of the clay soil within such pile is determined. A solution having at least 4 molar concentration of hydroxy-aluminum and potassium chloride is admixed with the clay soil.

OBJECTS OF THE INVENTION

It is a particular object of the present invention to provide a method of stabilizing a clay containing soil deposit by admixing with selected portions of the clay soil in the deposit an effective amount of hydroxy-aluminum and potassium chloride solution having a concentration of at least 4 molar which reacts with the clay to form pile like intrusions in the clay deposit to anchor the deposit and thus provide stability to the deposit. Additional objects and advantages of the present invention will become apparent from reading the following detailed description in view of the accompanying drawings which are made a part of this specification.

BRIEF DESCRIPTION OF THE DRAWINGS

FIG. 1 is a sectional view of a clay containing earth formation illustrating in schematic form the preferred apparatus for admixing, in accordance with the present invention, a solution of chemicals with clay in situ in the formation to thereby form a stabilizing pile in the formation.

FIG. 2 is an enlarged schematic view of a portion of the apparatus of FIG. 1 and aids in providing a better understanding of the present invention.

FIG. 3 is a schematic plan view of an example layout of piles formed in accordance with the present invention useful in stabilizing a clay soil formation under a roadbed.

FIG. 4 is a sectional view taken at line 4—4 of FIG. 3.

FIG. 5 is a schematic plan view of an example layout of piles formed in accordance with the present invention useful in stabilizing a clay soil formation under a foundation of a building or the like.

FIG. 6 is a sectional view taken at line 6—6 of FIG. 5.

FIG. 7 is a schematic sectional view of test apparatus utilized in laboratory demonstrations of diffusion effects when utilizing the method of the present invention; and FIGS. 8-14 are graphs showing plots of experimental data useful in understanding the present invention.

DETAILED DESCRIPTION OF THE INVENTION

The present invention is directed to stabilizing clay soil by admixing with at least portions of such soil an effective amount of a solution of chemicals including hydroxy-aluminum and a chemical selected from the group consisting of potassium chloride, potassium nitrate, potassium sulfate, ammonium chloride, ammonium nitrate and ammonium sulfate. Potassium chloride is the preferred chemical for mixture with the hydroxy-aluminum. In preferred form a plurality of pile-like deposits are formed in situ in the clay soil deposit by admixing with clay a hydroxy-aluminum and potassium chloride solution having a concentration of at least 4 molar and in an amount of at least 5 ml per 100 grams of clay soil wet weight. Best results appear to be obtained when the solution be at least 6 molar and preferably be as concentrated as possible without premature gelling. For different clays the optimum concentration of hydroxy-aluminum may, of course, vary. Optimum concentration for a given clay may be determined by simple laboratory tests as herein described.

Hydroxy-aluminum, useful in accordance with the present invention, has a hydroxyl to aluminum ratio of at least 2.0. At low pressure, hydroxyl to aluminum ratios of less than 2.2 tend to be so acidic that carbonates contained in the clay soil turn to carbon dioxide which causes bubbles that are undesired in the present invention. Therefore, in carbonate containing soils it is preferred to use hydroxy-aluminum having a hydroxyl to aluminum ratio of 2.5 in the present invention.

Thus, hydroxy-aluminum, useful in the present invention, has the general formula $Al(OH)_n X_{3-n}$ where n has a value of at least 2.0 and preferably 2.5 to 2.7 and x is an anion selected from the group consisting of chloride, bromide, iodide, nitrate, sulfate and acetate. The hydroxy-aluminum solutions used in accordance with the present invention are aqueous solutions. Hydroxy-aluminum is a commercially available chemical and can be obtained, for example, from Reheis Chemical Company of Berkeley Heights, N.J. or Hoechst Aktiengesellschaft, Frankfurt am Main, West Germany.

In accordance with the invention the concentration of the hydroxy-aluminum solution should be at least 4 molar. Best results are obtained when the concentration of the hydroxy-aluminum is 6 molar or greater. Although at least one manufacturer indicates that a 6.2 molar solution of hydroxy-aluminum is saturated, it has been found that much higher concentrations can be used in accordance with the present invention. Thus, concentrations of hydroxy-aluminum solution of 9 to 10 molar are useful and desirable in accordance with the present invention. The highly concentrated solutions will gel more rapidly than the lower, i.e., 6.2 molar solutions which are very stable and have a long shelf life. However, the more concentrated solutions, i.e. 7 to 10 molar, may be prepared in the field and have sufficient life before gelling to permit admixing with the clay to give beneficial results. The time at which a given hydroxy-aluminum solution will gel, depends both on concentration and temperature.

Thus the higher the temperature and the higher the concentration, the shorter the gel time will be. A 9 molar solution of hydroxy-aluminum was prepared and remained in solution at 74° F. for at least four hours. It was then left overnight and when observed sixteen hours later had gelled. Simple experiments knowing temperature expected and clay-hydroxy-aluminum solution-clay mixing times can be done to permit optimizing the molar concentration at the highest possible level. Concentration of the other chemical, for example potassium chloride, should preferably also be at least 4 molar to get the beneficial effects of the invention.

In a broad form, the present invention contemplates utilizing a solution of hydroxy-aluminum and a chemical effective in diffusing into undisturbed quick clay. Potassium chloride is the preferred chemical. Other chemicals which give beneficial effects of the nature sought include potassium nitrate, potassium sulfate, ammonium chloride, ammonium nitrate and ammonium sulfate. Salts of nobidium and cesium also exhibit some beneficial effects but these are not economically feasible for commercial use.

Broadly, in accordance with the present invention, a solution of at least 4 molar concentration of hydroxy-aluminum and a chemical selected from the group consisting of potassium chloride, potassium nitrate, potassium sulfate, ammonium chloride, ammonium nitrate, and ammonium sulfate are thoroughly mixed with the clay soil to form pile-like extensions in the clay soil. Preferably, the solution is formed with hydroxy-aluminum and potassium chloride. Preferably, the mixing with clay is done in situ by a suitable mechanical means. In preferred form apparatus, such as schematically illustrated in FIGS. 1 and 2, is used to the solution of the present invention with the clay soil.

Referring to FIGS. 1 and 2, a clay soil deposit 10 is shown. An auger-like device represented generally by the numeral 12, is shown penetrating the clay deposit in bore 14 which will form the pile. The auger 12 includes a bit 16 and a hollow drill stem 18. Means (not shown) are provided to rotate the auger 12 and to inject solution into and down drill stem 18 for mixing with the clay soil 10 in bore 14.

FIG. 2 shows bit 16 in more detail. The bit is formed by a curved cutting element 20 which when rotated mixes the clay soil into which is advanced. A plurality of ports 22a, b, etc. are formed in the collar 24 at the lower end of drill stem 18. Solution is moved through the ports 22a, etc. and contacted with the clay as the auger is rotated and moved up or down into and out of the clay deposit. The solution mixes with the clay and reacts to stabilize the clay. The reaction is rapid but not immediate so that mixing can occur both as the auger is driven down into the earth and as it is moved back up the bore. Thus, the chemicals of the present invention can be more thoroughly mixed with the clay in situ insuring better results.

FIGS. 3 and 4 show an example of a practical application of the present invention. FIG. 3 is a schematic plan view of an example layout of piles formed in accordance with the present invention useful in stabilizing a clay soil deposit under a roadbed. FIG. 4 is a sectional view taken at line 4—4 of FIG. 3.

A roadbed 40 is illustrated in FIGS. 3 and 4. The roadbed passes over an unstable clay deposit indicated generally as 42. In order to stabilize the clay deposit 42 sufficiently to bear the stresses imposed by the roadbed 40 a series of pile-like structures indicated generally as 44a, b, c, have been formed by mixing hydroxy-aluminum and potassium chloride with the clay soil. Preferably, piles 44a, b, c are formed along the sides of the roadbed as well as directly below the roadbed. Note that the piles not only serve to support the roadbed from below but also to assist in stabilizing the deposit on both sides of the roadbed including the sloping side which is supported by piles 44c.

FIGS. 5 and 6 illustrate another example of a practical application of the present invention. FIG. 5 is a schematic plan view of an example layout of piles formed in accordance with the present invention useful in stabilizing a clay soil formation located under a foundation of a building or the like. FIG. 6 is a sectional view taken at line 6—6 of FIG. 5.

A building foundation is schematically shown in FIGS. 5 and 6 and is indicated by the numeral 50. A clay soil deposit 52 is located below the foundation 50. A plurality of piles indicated by the numerals 56a, b, c, have been formed below, inside and outside of the foundation 50 to stabilize the clay deposit.

A series of laboratory demonstrations involving stabilizing clay were conducted utilizing the chemicals of the present invention as well as other chemicals. These demonstrations will now be described in detail with reference to FIGS. 7-14. FIG. 7 is a schematic sectional view of test apparatus utilized in laboratory demonstrations of diffusion effects when utilizing the method of the present invention and FIGS. 8-14 are graphs showing plots of experimental data useful in understanding the present invention.

Initially, two Norwegian clays were subjected to tests. These were a Norwegian quick clay and a marine salt clay. Almost all the present demonstration work was done on the Norwegian quick clay. Table I below sets out the properties of the two clays.

TABLE I
PROPERTIES OF THE NORWEGIAN QUICK CLAY AND MARINE SALT CLAY

| | Clay Type | |
|---|---|---|
| | quick | salt |
| Water Content (1% of dry weight - Measured on the original clay as an average value for each tube) | 35.0–38.3 | 52 |
| Shear Strength (kPa - Measured by the falling cone method) | 7–10 | 7.0 |
| Porewater Chemistry | | |
| pH | 7.9–8.2 | 8.0 |
| Na (ppm) | 150–300 | — |
| K (ppm) | 10–20 | — |
| Ca (ppm) | 10–40 | — |
| Mg (ppm) | 3–20 | — |
| Conductive power | 6.4 Ohms | — |
| $CaCO_3$ | 1.4% | — |
| Organic carbon | 0.6% | — |
| Salt content (expressed as $N_2Cl$) | 0.4 g NaCl/l | 20 g NaCl/l |
| Grain size | sand 1% | 1% |
| | silt 57% | 64% |
| | Clay 42% | 35% |
| Mineralogy | (clay) | (silt) |
| Illite/Musc. | 65% | 30% |
| Chlorite | 30% | 10–15% |
| Quartz | 0–5% | 20% |
| K-feldspar | | 15–20% |
| Plagioclase | 5% | 15–20% |

Aluminum-hydroxy chloride $Al(OH)_{2.5}Cl_{0.5}$ (further noted as hydroxy-aluminum) has a stabilizing effect on Norwegian quick clay. The quick clay, which is very soft in natural state, is liquid when remoulded. After addition of hydroxy-aluminum the admixture will be solid at first, then soften somewhat with more silty properties. Within minutes the mixture will polymerize and after a few days it will be a hard clay. The addition of lime used heretofore in the prior art has a somewhat similar effect. However, the difference between hydroxy-aluminum of the present invention and lime as stabilizing agents lies in how they act upon the surrounding undisturbed quick clay. Hydroxy-aluminum has a stabilizing effect some centimeters into the undisturbed clay with a firmness of about one-tenth of the admixture. On the other hand, lime has very small effects on the undisturbed clay. Compared with KCl which was also used alone heretofore, hydroxy-aluminum has a much higher firmness in the mixture, but KCl diffuses much faster into the undisturbed quick clay and stabilizes the ground to some extent many centimeters from the mixture. It has been found that a combination of OH-Al and KCl takes care of the best properties of both stabilizing agents and give a hard core with a soft to medium undisturbed clay. As a result of attracting water the firmness of the hydroxy-aluminum mix will decrease somewhat to about one-third within a couple of months, but totally this effect has little influence on the beneficial effect of the present invention.

In general, the laboratory demonstrations were divided into two parts. One part was concerned with determination of the optimum mixing ratio (Series A1) and the time dependency (Series A2) of dry hydroxy-aluminum and hydroxy-aluminum solution. The second part examined diffusion effects from a stabilized clay into an undisturbed clay. Liquid and solid hydroxy-aluminum as the only stabilizing agent are marked as Series B1 and Series B2 respectively. Mixed with KCl they are marked Series C1 and C2 and with methanol D1 and D2.

The demonstrations of part one show the superiority of utilizing dry hydroxy-aluminum over hydroxy-aluminum solution. However, it is recognized that hydroxy-aluminum solution does provide substantial beneficial effects. Table II sets out the concentrations of hydroxy-aluminum used in the A1 series. In this regard note that the A1 refers to the particular series; the next number refers to the number of days passed before sampling and the latter indicates the segment number counting from the top where the test was made.

TABLE II and 100 d. The same procedure was used for the salt marine clay illustrated as Series A3 in Table III.

The clay was mixed and put into a plastic beaker with cover. This was covered with plastic films and put aside in a container with $N_2$ gas and stored at 7° C. Shear strength was measured on each sample. Some were squeezed and the pore water measured with respect to pH and in a few cases Ca, Mg, K, and Na by atomic absorption.

The results of a series of demonstrations conducted as described are set out in Table III below.

TABLE III

Results of the concentration dependent experiments (A1), time dependent experiments (A2) and experiment with salt marine clay (A3) with dry hydroxy-aluminum and hydroxy-aluminum solution

| Code | Duration (days) | Shear Strength After the Experiment Undisturbed (kPa) | Water Content (%) | pH | Ca | Mg | K | Na |
|---|---|---|---|---|---|---|---|---|
| A1-00 | 0 | 9.8 | 36.0 | 7.9 | 10.4 | 4.0 | 13 | 170 |
| A1-1a | 1 | 18.5 | | 6.1 | | | | |
| A1-1b | 1 | 5.0 | | 7.2 | | | | |
| A1-1c | 1 | 0.5 | | 7.7 | | | | |
| A1-1d | 1 | <0.1 | | 7.7 | | | | |
| A1-7a | 7 | 50 | | | | | | |
| A1-7b | 7 | 6.5 | | | | | | |
| A1-7c | 7 | 1.2 | | | | | | |
| A1-7d | 7 | <0.1 | | | | | | |
| A1-7e | 7 | 39 | | | | | | |
| A1-7f | 7 | 70 | | | | | | |
| A1-7g | 7 | 145 | | 6.9 | 6900 | 900 | 370 | 920 |
| A1-7h | 7 | 240 | | | | | | |
| A1-7i | 7 | >375 | | | | | | |
| A2-01 | 1h | 25 | | | | | | |
| A2-1 | 1 | 18.5 | | 6.1 | | | | |
| A2-3 | 3 | 61 | | | 4880 | 610 | 140 | 660 |
| A2-7 | 7 | 50 | | | | | | |
| A2-30 | 30 | | | 6.7 | 6950 | 740 | 230 | 890 |
| A2-100 | 104 | 60 | | 6.7 | | | | |
| A2-7* | 7 | 63 | | 6.0 | 6670 | 720 | 170 | 790 |
| A2-30* | 28 | 75 | | | | | | |
| A2-100* | 102 | 78 | | 7.5 | | | | |
| A3-00 | 0 | 7.0 | 52.2 | | | | | |
| A3-01 | 1h | 0.6 | | | | | | |
| A3-1 | 1 | 0.6 | | | | | | |
| A3-3 | 3 | 0.6 | | | | | | |
| A3-7 | 7 | 0.8 | | | | | | |
| A3-30 | 30 | 2.4 | | | | | | |
| A3-100 | 100 | 3.8 | | | | | | |
| A3-7f | 7 | 1.9 | | 8.0 | 260 | 680 | 240 | 6300 |

In Series A1, with concentration variations, the following mixing ratio was used:

| Series No. | ml 6.2 M OH—Al or g OH—Al powder per 100 g clay wet weight | | g OH—Al/100 g clay dry weight |
|---|---|---|---|
| A1-1a / A1-7a | 5 ml | 6.2 M | 3.62 |
| A1-1b / A1-7b | 5 ml | 0.62 M | 0.362 |
| A1-1c / A1-7c | 5 ml | 0.062 M | 0.0362 |
| A1-1d / A1-7d | 5 ml | 0.0062 M | 0.00362 |
| A1-7e | 0.8 | | 1.09 |
| A1-7f | 2.5 | | 3.4 |
| A1-7g | 5 | | 6.8 |
| A1-7h | 10 | | 13.6 |
| A1-7i | 15 | | 20.4 |

In Series A2, with time variations, only 5 ml 6.2 M OH-Al/100 g clay wet weight was used with an experimental duration of 1 h (hour), 1 d (day), 3 d, 7 d, 30 d, The results shown in Table III show that results obtained with dry hydroxy-aluminum is superior to the results obtained with hydroxy-aluminum solution. The concentration of hydroxy-aluminum admixture varied from 0–15% of clay wet weight (or 0–20% dry weight) (Series A1). The results presented in drawing in Table III show that the shear strength varies from that of liquid (<0.1 kPa) to a hard compacted clay (>375 kPa) when the admixture of hydroxy-aluminum rises. A comparison of the liquid admixture with the dry admixture shows that the addition of water together with hydroxy-aluminum decreases the stabilizing effect.

Small additions of dry hydroxy-aluminum (up to about 5%, i.e. 8% dry weight) turns the clay plastic immediately. While small addition of hydroxy-aluminum gave plastic clay immediately, increased addition gave at first a stiffer clay that within a minute of mixing turns looser. Then it got a silty character and changes slowly into a harder clay. If the solid hydroxy-aluminum is not sufficiently mixed, it will attract water and make a brittle gel.

Clay and hydroxy-aluminum solution were mixed at the standard ratio of 5 ml of 6.2 M OH-Al to 100 g of clay wet weight and put aside for 1 h (hour), 1 d (day), 3 d, 7 d, 30 d, and 100 d. Shear strength tests were carried out and the results are given in drawing in Table III. Tests marked with * are carried out later than the others on perhaps less oxidized clay. It is noteworthy that the shear strength is raised above that of the undisturbed clay after only a few minutes.

Salt marine clay and OH-Al were mixed at standard ratio of 5 ml of 6.2 M OH-Al to 100 g of clay (wet weight) and put aside for 1 h (hour), 1 d (day), 3 d, 7 d, 30 d, and 100 days. Shear strength was measured and the results are presented in drawing in Table III. Because of the very high water content in the clay, additional water from liquid OH-Al made the clay liquid. Within 100 days the remoulded salt marine clay never reached the original shear strength. The results will obviously be better with dry hydroxy-aluminum in this case.

The part two demonstrations to illustrate diffusion effects from the stabilized clay will now be discussed in detail. The diffusion experiments there utilized small brass cylinders 35 mm in diameter with varying height as schematically illustrated in FIG. 7. The cylinders were sealed in the bottom and the uppermost 5 cm above the top of the undisturbed quick clay were filled with the mixture. As indicated in Table IV below, in the indicated series the remoulded clay mixture comprised:

TABLE IV

| | |
|---|---|
| B1 | 5 ml 6.2 M OH—Al/100 g clay wet weight |
| B2 | 15 g OH—Al powder/100 g clay wet weight |
| C1 | 5 ml 6.2 M OH—Al + 9.5 g solid KCl/100 g clay wet weight |
| C2 | 15 g OH—Al powder + 9.5 g solid KCl/100 g clay wet weight |
| D1 | 5 ml 6.2 M OH—Al + 5 ml methanol/100 g clay wet weight |
| D2 | 15 g OH—Al powder + 5 ml methanol/100 g clay wet weight |

TABLE IV-continued
weight

The samples were sealed with plastic and put aside for 7 d (days), 30 d, and 100 d in an $N_2$ filled container at 7° C. The consistency of the mixtures caused only small problems. The remoulded clay in the B series was liquid, in the C series dry and plastic, and in the D series wet and plastic.

After storage the clay columns were pushed out and shear strength measured. Afterwards the clay was cut into slices 2.5 cm each. Out of each slice, one part was measured with regard to water content, and another part squeezed and measured with regard to pH and analyzed for Ca, Mg, K, and Na in pore water by atomic absorption.

Tables V through IX below and FIGS. 8–14 illustrate the results of these demonstrations.

In these tables the series number is followed by a specimen number indicating the experimental duration in days. A third number indicates the segment number, counted from the top of the cylinder downwards. For instance, C2-30-8, where C-2 denotes solid OH-Al mixed with KCl, 30 denotes 30 days' duration and 3 denotes the third segment from the top.

Each segment is measured with regard to shear strength. The method applied is the falling cone method, where a sharp cone penetrates by its own gravity into the clay. Millimeters of penetration are transformed into kPa ($kN/m^2$) by a standard curve. Other measured parameters were water content (in % of dry weight), pH, and Ca-, Mg-, K-, and Na-content of the squeezed pore water. The elements were measured by atomic absorption with a precision that may reach an uncertainty of ±60% in some of the results. As a reference for the experiments, the natural quick clay was analyzed with regard to mineralogy, grain size distribution, cation exchange capacity, inorganic and organic carbon and salt content.

TABLE V

Results of the Diffusion Experiments with Hydroxy-aluminum OH—Al Solution (B1) and Dry Hydroxy-aluminum (B2)

| Code | Duration (days) | Shear Strength After the Experiment Undisturbed (kPa) | Water Content (%) | pH | Pore Water Composition (ppm) | | | |
|---|---|---|---|---|---|---|---|---|
| | | | | | Ca | Mg | K | Na |
| B1-7-1 | 7 | 63 | 44.3 | 7.6 | | | | |
| B1-7-2 | | 63 | 43.1 | 6.7 | 5000 | 1410 | 150 | 750 |
| B1-7-3 | | 14 | 31.6 | 7.3 | 610 | 270 | 64 | 610 |
| B1-7-4 | | 11.7 | 34.8 | | 200 | 89 | 44 | 440 |
| B1-7-5 | | | 36.6 | | | | | |
| B1-7-6 | | 9.2 | 36.8 | | | | | |
| B1-30-1 | 28 | 73 | 44.5 | | | | | |
| B1-30-2 | | 63 | 47.9 | 7.1 | 5010 | 500 | 5700 | 510 |
| B1-30-3 | | 22 | 33.2 | | 3520 | 530 | 2570 | 610 |
| B1-30-4 | | 23 | 36.0 | 7.9 | 660 | 270 | 330 | 500 |
| B1-30-5 | | 21 | 37.0 | | | | | |
| B1-30-6 | | 15 | 37.8 | | | | | |
| B1-100-1 | 100 | 52 | 44.3 | | | | | |
| B1-100-2 | | 73 | 44.5 | 7.8 | 4020 | 450 | 110 | 720 |
| B1-100-3 | | 14 | 33.2 | 7.4 | 3600 | 480 | 88 | 960 |
| B1-100-4 | | 11 | 36.3 | 8.3 | 2260 | 460 | 99 | 610 |
| B1-100-5 | | 10 | 37.2 | 8.3 | 1480 | 390 | 75 | 670 |
| B1-100-6 | | 15 | 38.2 | 8.3 | 780 | 400 | 86 | 710 |
| B2-7-1 | 7 | 310 | 33.9 | | | | | |
| B2-7-2 | | 310 | 40.7 | | | | | |
| B2-7-3 | | 27 | 34.2 | | 3720 | 610 | 110 | 680 |
| B2-7-4 | | 25 | 35.8 | 7.3 | 370 | 98 | 27 | 440 |
| B2-7-5 | | 15 | 36.3 | 7.6 | 31 | 5.2 | 13 | 200 |
| B2-7-6 | | 24 | 34.3 | 7.8 | 65 | 6.2 | 18 | 200 |
| B2-30-1 | 30 | 140 | 40.4 | | | | | |
| B2-30-2 | | 98 | 43.5 | | | | | |

TABLE V-continued

Results of the Diffusion Experiments with Hydroxy-aluminum OH—Al Solution (B1) and Dry Hydroxy-aluminum (B2)

| Code | Duration (days) | Shear Strength After the Experiment Undisturbed (kPa) | Water Content (%) | pH | Pore Water Composition (ppm) Ca | Mg | K | Na |
|---|---|---|---|---|---|---|---|---|
| B2-30-3 | | 25 | 36.9 | 6.5 | 3550 | 660 | 270 | 810 |
| B2-30-4 | | 31 | 38.0 | 7.9 | 760 | 350 | 110 | 750 |
| B2-30-5 | | 27 | 35.7 | 8.1 | 160 | 140 | 60 | 620 |
| B2-30-6 | | 23 | 35.0 | 8.5 | 28 | 21 | 77 | 450 |
| B2-100-1 | 100 | 90 | 44.6 | | | | | |
| B2-100-2 | | 125 | 42.7 | | | | | |
| B2-100-3 | | 40 | 35.6 | 7.2 | 6120 | 870 | 200 | 1210 |
| B2-100-4 | | 52 | 34.3 | 7.2 | 2200 | 420 | 100 | 850 |
| B2-100-5 | | 32 | 33.1 | | 1850 | 580 | 200 | 950 |
| B2-100-6 | | 20 | 33.5 | | 1150 | 530 | 220 | 1040 |

TABLE VI

Results of the Diffusion Experiments With Hydroxy-aluminum Solution and Potassium Chloride

| Code | Duration (days) | Shear Strength After the Experiment Undisturbed (kPa) | Water Content (%) | pH | Pore Water Composition (ppm) Ca | Mg | K | Na |
|---|---|---|---|---|---|---|---|---|
| C1-7-1 | 7 | 26 | 55.4 | | | | | |
| C1-7-2 | | 31 | 52.0 | 6.0 | 4260 | 540 | 64700 | 600 |
| C1-7-3 | | 26 | 34.4 | 7.0 | 2390 | 560 | 39500 | 620 |
| C1-7-4 | | 15 | 33.3 | 8.2 | 770 | 500 | 12000 | 780 |
| C1-7-5 | | 10 | 36.0 | 8.6 | 250 | 170 | 960 | 520 |
| C1-7-6 | | 9.5 | 36.8 | | 63 | 121 | 580 | 210 |
| C1-30-1 | 30 | 72 | 42.9 | 6.5 | 5080 | 580 | 58500 | 740 |
| C1-30-2 | | 55 | 43.4 | | | | | |
| C1-30-3 | | 53 | 32.7 | | | | | |
| C1-30-4 | | 33 | 35.5 | 6.8 | 1470 | 560 | 21800 | 820 |
| C1-30-5 | | 31 | 36.5 | | 710 | 470 | 7740 | 570 |
| C1-30-6 | | 32 | 36.7 | 6.7 | 520 | 370 | 1610 | 590 |
| C1-30-7 | | 27 | 36.5 | 6.8 | 270 | 180 | 450 | 520 |
| C1-30-8 | | 16 | 37.1 | 7.1 | 74 | 34 | 48 | 370 |
| C1-30-9 | | 15 | 35.2 | | | | | |
| C1-30-10 | | 3.0 | 38.1 | 7.8 | 45 | 8.0 | 40 | 240 |

TABLE VII

Results of the Diffusion Experiments With Dry Hydroxy-aluminum and Potassium Chloride

| Code | Duration (days) | Shear Strength After the Experiment Undisturbed (kPa) | Water Content (%) | pH | Pore Water Composition (ppm) Ca | Mg | K | Na |
|---|---|---|---|---|---|---|---|---|
| C2-7-1 | 7 | 280 | 32.0 | | | | | |
| C2-7-2 | | >375 | 36.1 | | | | | |
| C2-7-3 | | 33 | 33.7 | 7.3 | 2880 | 670 | 32700 | 820 |
| C2-7-4 | | 31 | 35.6 | 8.0 | 570 | 420 | 6800 | 630 |
| C2-7-5 | | 18 | 37.3 | 7.6 | 105 | 64 | 180 | 380 |
| C2-7-6 | | 11 | 34.9 | 7.8 | 37 | 5.3 | 21 | 180 |
| C2-30-1 | 30 | 310 | 37.9 | | | | | |
| C2-30-2 | | 375 | 38.6 | | | | | |
| C2-30-3 | | 30 | 34.8 | 7.6 | 4160 | 800 | 52000 | 960 |
| C2-30-4 | | 36 | 34.4 | 7.7 | 1540 | 630 | 26400 | 880 |
| C2-30-5 | | 30 | 36.9 | | | | | |
| C2-30-6 | | 27 | 40.5 | 8.4 | 450 | 380 | 3840 | 710 |
| C2-30-7 | | 31 | 34.4 | | | | | |
| C2-30-8 | | 12 | 38.1 | 8.3 | 38 | 15 | 39 | 340 |
| C2-30-9 | | 11 | 35.8 | | | | | |
| C2-30-10 | | 15 | | 7.5 | 19 | 5.1 | 20 | 270 |
| C2-100-1 | 100 | 95 | 44.4 | | | | | |
| C2-100-2 | | 240 | 45.0 | | | | | |
| C2-100-3 | | 29 | 33.6 | 7.6 | 3620 | 890 | 35500 | 1210 |
| C2-100-4 | | 39 | 37.3 | | | | | |
| C2-100-5 | | 39 | 38.4 | 8.0 | 1700 | 660 | 20200 | 1000 |
| C2-100-6 | | 42 | 34.8 | | | | | |
| C2-100-7 | | 42 | 39.9 | 8.2 | 660 | 470 | 5780 | 750 |
| C2-100-8 | | 24 | 34.9 | | | | | |
| C2-100-9 | | 23 | 37.3 | 8.3 | 360 | 300 | 1240 | 620 |
| C2-100-10 | | 23 | 36.0 | | | | | |
| C2-100-11 | | 19 | 36.9 | 8.3 | 54 | 36 | 79 | 440 |
| C2-100-12 | | 14 | 37.2 | | | | | |
| C2-100-13 | | 11 | 38.2 | 8.3 | 25 | 6.8 | 53 | 280 |

TABLE VII-continued

Results of the Diffusion Experiments With
Dry Hydroxy-aluminum and Potassium Chloride

| Code | Duration (days) | Shear Strength After the Experiment Undisturbed (kPa) | Water Content (%) | pH | Pore Water Composition (ppm) | | | |
|---|---|---|---|---|---|---|---|---|
| | | | | | Ca | Mg | K | Na |
| C2-100-14 | | 8.3 | 33.8 | 8.3 | 150 | 9.0 | 69 | 350 |

TABLE VIII

Results of the Diffusion Experiments with
Hydroxy-aluminum Solution and Methanol

| Code | Duration (days) | Shear Strength After the Experiment Undisturbed (kPa) | Water Content (%) | pH | Pore Water Composition (ppm) | | | |
|---|---|---|---|---|---|---|---|---|
| | | | | | Ca | Mg | K | Na |
| D1-7-1 | 7 | 26 | 55.4 | | | | | |
| D1-7-2 | | 31 | 52.0 | 6.0 | 4400 | 500 | 93 | 440 |
| D1-7-3 | | 26 | 34.3 | 7.0 | 1480 | 300 | 64 | 460 |
| D1-7-4 | | 15 | 33.3 | 8.2 | 150 | 56 | 28 | 360 |
| D1-7-5 | | 10 | 36.0 | 8.6 | 58 | 13 | 16 | 190 |
| D1-7-6 | | 9.5 | 36.8 | | | | | |
| D1-30-1 | 29 | 31 | 56.7 | | | | | |
| D1-30-2 | | 31 | 49.6 | 6.9 | 3530 | 430 | 82 | 390 |
| D1-30-3 | | 22 | 51.7 | 7.7 | 2130 | 380 | 61 | 430 |
| D1-30-4 | | 21 | 38.6 | 8.0 | 840 | 280 | 47 | 440 |
| D1-30-5 | | 19 | 36.9 | | | | | |
| D1-30-6 | | 9.1 | 37.4 | 8.3 | 62 | 12 | 15 | 280 |
| D1-30-7 | | 10 | 36.7 | | | | | |
| D1-30-8 | | 7.6 | 37.6 | 8.1 | 17 | 4.5 | 14 | 170 |
| D1-30-9 | | 7.8 | 35.9 | | | | | |
| D1-30-10 | | 9.2 | 38.8 | 8.2 | 12 | 4.0 | 13 | 170 |
| D1-100-1 | 105 | <0.1 | 89.9 | | | | | |
| D1-100-2 | | 39 | 52.0 | 6.1 | 2850 | 420 | 150 | 660 |
| D1-100-3 | | 15 | 38.4 | 6.5 | 2360 | 420 | 130 | 710 |
| D1-100-4 | | 18 | 39.1 | 7.0 | 1370 | 370 | 94 | 760 |
| D1-100-5 | | 15 | 39.4 | 7.3 | 970 | 330 | 106 | 810 |
| D1-100-6 | | 11 | 35.9 | 7.5 | 310 | 220 | 83 | 770 |

TABLE IX

Results of the Diffusion Experiments with
Solid Dry Hydroxy-aluminum and Methanol

| Code | Duration (days) | Shear Strength After the Experiment Undisturbed (kPa) | Water Content (%) | pH | Pore Water Composition (ppm) | | | |
|---|---|---|---|---|---|---|---|---|
| | | | | | Ca | Mg | K | Na |
| D2-7-1 | 7 | 125 | 42.7 | | | | | |
| D2-7-2 | | 90 | 49.8 | | | | | |
| D2-7-3 | | 41 | 35.4 | 7.9 | 1630 | 380 | 52 | 600 |
| D2-7-4 | | 24 | 36.0 | 8.3 | 230 | 110 | 38 | 470 |
| D2-7-5 | | 13 | 37.0 | 8.4 | 25 | 5.9 | 14 | 170 |
| D2-7-6 | | 7 | 34.9 | 8.5 | 22 | 5.6 | 45 | 150 |
| D2-30-1 | 30 | 48 | 49.7 | | | | | |
| D2-30-2 | | 27 | 55.9 | | | | | |
| D2-30-3 | | 33 | 34.7 | 7.4 | 4200 | 540 | 102 | 720 |
| D2-30-4 | | 35 | 35.1 | 8.2 | 930 | 290 | 63 | 690 |
| D2-30-5 | | 27 | 36.3 | | | | | |
| D2-30-6 | | 18 | 39.4 | 8.3 | 32 | 14 | 29 | 340 |
| D2-30-7 | | 14 | 34.0 | | | | | |
| D2-30-8 | | | 34.8 | 8.3 | 43 | 5.8 | 25 | 190 |
| D2-30-9 | | 7.1 | 49.0 | | | | | |
| D2-30-10 | | 10 | 35.3 | 8.5 | 40 | 3 | 15 | 180 |
| D2-100-1 | 102 | <0.1 | 51.5 | | | | | |
| D2-100-2 | | <0.1 | 33.5 | | | | | |
| D2-100-3 | | | 49.0 | | 4190 | 710 | 200 | 630 |
| D2-100-4 | | | 34.2 | | 2250 | 550 | 160 | 740 |
| D2-100-5 | | | 34.0 | | 1350 | 500 | 170 | 860 |
| D2-100-6 | | | 33.0 | | 1530 | 530 | 180 | 960 |

In the demonstrations of part 2 and as shown in Tables V-IX above and FIGS. 8-14, cylinders of undisturbed quick clay were used. The length of the cylinders varied from 10 to 30 cm. Some of them contained silty layers, which caused varying shear strength and water content, and most probably also somewhat affected the diffusion.

The inhomogeneity of the cylinders may cause disturbances both when the clay is pushed into the cylinders and out of them. Sometimes the disturbances caused drainage of water, that was gathered at the bottom. Oxidation of the clay was depressed because the cylinders were stored in $N_2$ atmosphere at 7° C.

As shown in FIG. 7 the remoulded clay stabilized with either hydroxy-aluminum and KCl or hydroxy-aluminum and methanol or hydroxy-aluminum alone was placed at the top of the cylinders. Then the cylinders were sealed with several plastic layers and put aside for 7, 30 or 100 days. At the end of each run the clay was pushed out and the various parameters measured down the cylinder.

When remoulded and mixed with (6.2 M) hydroxy-aluminum solution, the clay turns stiff (60 kPa) and remains stiff (50–80 kPa) throughout the testing period. Table V and Table VI, show rather low shear strength values in the undisturbed clays caused by diffusion. The efficiency and the penetration of the stabilizing effect in the undisturbed clay are not clear.

The water content shows that the hydroxy-aluminum admixture draws the water out of the undisturbed clay. This effect is also observed in all the other experiments. Another parameter with much the same development in all experiments is the pH value. Hydroxy-aluminum has an acidic reaction, which penetrates to some extent down the column, but will be neutralized by time.

The pore water chemistry is much the same in the three experiments. There are two exceptions: Extremely high potassium release in B1-30 series and high magnesium content in B1-7 series.

Remoulding of the quick clay with hydroxy-aluminum apparently releases a substantial amount of cations to the pore fluid. For instance the potassium concentration increases by a factor of nearly 10, magnesium by about 100 and calcium by more than 200. The resulting concentration difference between the remoulded and the undisturbed clay, subsequently drives the diffusion of these cations into the undisturbed clay.

Dry hydroxy-aluminum admixture gives much better geotechnical results compared to hydroxy-aluminum solution admixture. The remoulded clay immediately gets a higher shear strength which with time reduces to about ⅓ of the original shear strength value as shown in Tables V, VI, VII and VIII. The stabilizing effect with time on the undisturbed clay are less ambiguous with dry hydroxy-aluminum than with hydroxy-aluminum solution. The penetration series into the original clay develops a medium strength (25–50 kPa) 4–9 cm down the column during the test period.

Water content measurements confirm the already predicted osmotic effect of hydroxy-aluminum. The remoulded clay contains 30% more water than the undisturbed clay after 100 days. pH-measurements also confirm the acid reaction of hydroxy-aluminum. The difference may be at least 2 pH-units from the disturbed to the undisturbed clay. The pore water chemistry exhibits much the same trend as described before. The B2-100 series, however, shows for unknown reason higher release of Ca, Mg, and Na. Compared with hydroxy-aluminum solution dry hydroxy-aluminum releases K and Mg to the same extent (factor of 10 and 100), but Ca to a somewhat lesser extent; a factor of 100–200.

As shown in Table VI, admixing (6.2 M) hydroxy-aluminum solution and solid KCl gives a stiff remoulded clay with a shear strength of 50–80 kPa which is independent of experimental duration. The diffusion of species downwards in the undisturbed clay causes a medium stiff clay (25–50 kPa) to a depth of 6 cm (B1-7) and 11 cm (B1-30). Compared with hydroxy-aluminum solution alone the increased shear strength in the undisturbed clay is most probably caused by the diffusion of potassium ions.

Water content measurements indicate that some water drainage has taken place in the C1-7 series. Still it is possible to notice the osmotic effect of hydroxy-aluminum as indicated above. pH-measurements show a great difference between stabilized and undisturbed clay (at least 2.5 pH-units) at the beginning of the experiments. With time, the acid (H+) penetrates down the column and is slowly neutralized. The pore water chemistry has no different trends compared with already described experiments, except for the great addition of potassium. One dimensional diffusion constants have been estimated for K in both experiments in the C1 series. Approximate values are $6\times10^{-6}$ cm$^2$ sec$^{-1}$ for 7 days experiment and $3\times10^{-6}$ cm$^2$ sec$^{-1}$ for 30 days' experiment. The values are approximate because of no exact information of the reservoir concentration, or of the constancy of the reservoir concentration, the inhomogeneity of the clay and no chemical reactions or physical changes of the clay have been taken into account. The contents of Mg and Ca in the pore water are much the same as in series B1.

Table VII shows the results of dry hydroxy-aluminum and potassium chloride as stabilizing chemicals. This admixture gives a hard remoulded clay with an initial shear strength of 300–400 kPa which decreases during the test period to 100–200 kPa. The diffusion of species downward in the undisturbed clay causes a medium stiff clay (25–50 kPa) to a depth of 5 cm (C2-7), 10 cm (C2-10), and 20 cm (C2-100). It is noteworthy that the maximum shear strength in the undisturbed clay increases a little during the experimental period. As in series C1, potassium diffusion is the main reason for this increased shear strength.

Water content measurements show the same development as described earlier. The water content of the stabilized mixture increases with about 30% from 7 to 100 days. However, the decreased water content of the undisturbed clay is not explicitly expressed in the measurements of the undisturbed clay.

pH-measurements are available from only the undisturbed clay and show only a slight increase down the column. This trend is like those described before.

There are no considerable differences between these and the previous described pore water chemistry results. The one dimensional diffusion coefficients estimated for K in the three experiments were: $4\times10^{-6}$ cm$^2$ sec$^{-1}$ (C2-7), $4\times10^{-6}$ cm$^2$ sec$^{-1}$ (C2-30), and $3\times10^{-6}$ cm$^2$ sec$^{-1}$ (C2-100). The content of Ca and Mg in pore water are much the same as B2 series.

Demonstrations were conducted with hydroxy-aluminum solution containing methanol. The results are given in Table VIII. This admixture gives a rather soft remoulded clay which partly turns liquid during the test period (D1-100). The stabilizing effect of diffusing substances seems rather small. Only the uppermost 1 cm of the undisturbed clay has shear strength above 25 kPa in the beginning of the period, while some additional centimeters give values between 15 and 25 kPa. These results are not far from the B1 series which indicates that any positive effect of added methanol must be insignificant.

Water content measurements are ambiguous in showing the water attracting tendencies, probably because of additional liquid content in methanol. The pH-measurements show clearly a pH-gradient with H+ diffusion from the source down the column. The pore water chemistry values are very similar to those previously described.

Demonstrations were also conducted with dry hydroxy-aluminum with methanol as a stabilizing agent. The results are shown in Table IX. This admixture gives a stiff to very stiff (approximately 100 kPa) remoulded clay mixture within 7 days. After 30 days however, the shear strength has dropped to that of a medium clay (about 40 kPa). Unfortunately the D2-100 series was destroyed and no shear strength results were obtained from it. It is noteworthy that the upper 3 centimeters of the remoulded clay was turned liquid, the next centimeters very soft and the last centimeters stiff or very stiff. In the undisturbed clay shear strength increased to that of a medium clay (25–50 kPa) 4 cm down the column in 7 days and 7 cm in 30 days. It was impossible to estimate the penetration in the D2-100 series.

Water content measurements show great irregularities, but it is obvious that the admixture attracts water and even makes the remoulded clay liquid. The pH-gradients have the same trends as described before. The pore water chemistry also shows the same concentrations and trends as in the other series with dry hydroxy-aluminum. Specially for D2 series, however, is the penetration of species into the undisturbed clay somewhat slower.

FIG. 8 shows a comparison of hydroxy-aluminum solution alone and with various additives after 7 days. The hydroxy-aluminum solution admixture gives a stiff clay mixture (65 kPa) after 7 days. The addition of KCl causes no changes, but the addition of methanol reduces the shear strength to about 30 kPa probably due to increased liquid addition. In the undisturbed clay the hydroxy-aluminum solution causes a very small increase in shear strength and only to a depth of a few centimeters. The addition of methanol gives a little more efficient increase of the shear strength in the same few upper centimeters. The addition of KCl increases shear strength to a greater depth than the two others. The reason is most probably the addition of potassium, but some of the shear strength increase could have been caused by the released diffusing species like Ca and Mg.

FIG. 9 shows a comparison of dry hydroxy-aluminum alone and with various additives after 7 days. Dry hydroxy-aluminum admixture increases the shear strength of the remoulded clay to about 300 kPa (hard clay). Admixture of dry hydroxy-aluminum and KCl gives about the same shear strength, while addition of hydroxy-aluminum together with methanol only results in a shear strength of 100 kPa. The lower strength obtained with methanol, is obviously caused by the liquid addition.

The increase of shear strength in the undisturbed clay are much the same in all three experiments with a medium stiff clay (25–50 kPa) down to 4–5 cm. The differences between the series with and without KCl are also shown by the pore water chemistry where Ca, Mg, and K almost everywhere are higher in the KCl addition experiment. Why the shear strength in the D2 series lies above all the other, may be caused either by the Ca-concentration in the pore water or by the methanol content.

FIG. 10 shows a comparison of hydroxy-aluminum solution alone and with various additives after 30 days. Hydroxy-aluminum solution addition gave shear strength of about 70 kPa in the remoulded clay (drawing 036), nearly the same as hydroxy-aluminum solution and KCl admixture (about 60 kPa), while hydroxy-aluminum solution with methanol addition only reached 30 kPa.

In the undisturbed clay hydroxy-aluminum solution with or without methanol addition follow each other to a great extent. They have a strength of about 20 kPa 7–8 cm down the column even if the pore water chemistry of the series are not the same. Hydroxy-aluminum solution and KCl admixture is much more efficient than the other since it gives a medium stiff clay 11 cm down the column. Except for the first two centimeters the pore water content of Ca, Mg, and of course K are much greater in the C1-30 series than in the others, and this may be the reason why the shear strength values are much higher.

FIG. 11 shows dry hydroxy-aluminum data after 30 days. Dry hydroxy-aluminum admixtures give greater spreading in the shear strength values for different additions. Dry hydroxy-aluminum admixture gives about 100 kPa in the remoulded clay (drawing 037) while hydroxy-aluminum and KCl additions are much more efficient with 300–400 kPa. On the other hand hydroxy-aluminum and methanol admixture causes lower shear strength: 30–60 kPa.

In the undisturbed clay the hydroxy-aluminum and methanol admixture are most efficient the first 2 cm (about 35 kPa) just like the 7 days series. For the next 7 cm gives the hydroxy-aluminum and KCl admixture the greatest shear strength (25–35 kPa). There is a greater difference between the shear strength of the different admixtures after 30 days than after 7 days. In this series (B2-30, C2-30, and D2-30) there is no obvious connection between shear strength in undisturbed clay and pore water chemistry like that described before.

FIGS. 12 and 13 show comparison of the different stabilizing agents after 100 days. Hydroxy-aluminum solution admixture gives a stiff clay (50–80 kPa) even after 100 days, while the hydroxy-aluminum solution and methanol admixture gives varied values from that of a liquid (<0.1 kPa) in the uppermost 3 cm to 40 kPa in the lower 2 cm. The experiment with hydroxy-aluminum solution and KCl was not carried through.

The undisturbed clay are affected only to a small extent by the mixtures. The shear strength scarcely exceed 15 kPa to a depth of about 7 cm in hydroxy-aluminum solution and methanol admixture and only about 1 cm with the hydroxy-aluminum solution alone. There is a decrease of the shear strength in the undisturbed clay from 7 and 30 days experiments with hydroxy-aluminum solution.

As shown in FIG. 13, dry hydroxy-aluminum addition to quick clay gives a shear strength that increases from 90 to about 400 kPa from the top to bottom of the remoulded clay. This result is not far from the addition of dry hydroxy-aluminum and KCl which varies within the same values. The experiment with dry hydroxy-aluminum with methanol was destroyed and shear strengths were not obtained. In this case the uppermost 3 cm were in a liquid state.

In the undisturbed clay the shear strength exceed that of 30 days series to some extent. With dry hydroxy-aluminum alone the shear strength varied from 20–50 kPa to a depth of 9 cm, 4 cm of this exceed 40 kPa. On the other hand, admixture of dry hydroxy-aluminum and KCl shows shear strength between 25 and 50 kPa to a depth of 14 cm and higher than 20 kPa for additional 7 cm. There is a relatively good correlation between shear strength and pore water content of Ca, Mg, and K.

FIG. 14 shows a comparison of solid dry hydroxy-aluminum alone; KCl; and CaO stabilization after 100 days. Comparison of shear strength in the remoulded clay shows that dry hydroxy-aluminum admixture reaches a stiffness that exceeds that of CaO. This may be a coincidence because other mixing ratio and better tamping may increase the shear strength. KCl alone gives no stabilization effects.

In the undisturbed clay the stabilization effect is limited. Within 3 cm the shear strength below the CaO-stabilized clay drops from 100 to 20 kPa. With dry hydroxy-aluminum it drops from 50 to 20 kPa, 9 cm down the column while KCl have 20–25 kPa to a depth of 19 cm. The increased shear strength in the undisturbed clay is in CaO stabilization caused by the great water absorbing effect of lime. Hydroxy-aluminum has also as earlier described, a water attracting effect, but in this case the effect goes deeper into the column, probably because of higher cation content. In the lime stabilization experiment, the water transport upwards is camouflaged by the chemical reaction $CaO + H_2O \rightarrow Ca(OH)_2$, which binds a large amount of water. KCl has probably no effect on the water content.

Hydroxy-aluminum and potassium chloride solution having at least 4 molar concentration is a very promising stabilizing agent. As a practical matter at least a 6 molar solution should be used. Optimum results may be obtained at even high concentrations. An increased hydroxy-aluminum concentration is expected to give a further increase of the shear strength in the remoulded clay. Surprisingly, in the remoulded clay KCl does not reduce the effect of the strength attained by hydroxy-aluminum alone. In the undisturbed clay where hydroxy-aluminum has less effect, KCl diffuses relatively fast and causes stabilized zone deeper into the clay. This property of KCl is not interfered with by hydroxy-aluminum.

From the above description it is evident that the present invention provides a method of stabilizing clay of said deposits by hydroxy-aluminum and potassium solution with the clay soil. Although only specific embodiments of the present invention have been described in detail, the invention is not limited thereto but is meant to include all embodiments coming within the scope of the appended claims.

What is claimed is:

1. A method of stabilizing quick clay and salt clay soil comprising admixing the quick clay and salt clay soil with an effective amount of a solution of chemicals comprising hydroxy-aluminum and a chemical selected from the group consisting of potassium chloride, potassium nitrate, potassium sulfate, ammonium chloride, ammonium nitrate, and ammonium sulfate, said solution having a concentration of at least 4 molar.

2. The method of claim 1 where the hydroxy-aluminum in said solution is at a concentration of at least 6 molar.

3. The method of claim 2 where at least 5 ml of solution, per 100 grams clay soil wet weight is admixed with said clay soil.

4. The method of claim 1 where the hydroxy-aluminum in said solution is at a concentration of between 6 and 10 molar.

5. The method of stabilizing a quick clay or salt clay containing soil deposit by forming a plurality of pillars extending into said deposit comprising the steps of selecting the size of pillars to be formed, determining the wet weight of the quick clay or salt clay within said pillars and admixing a hydroxy-aluminum and potassium chloride solution of at least 4 molar concentration with said clay to form said pillars.

6. The method of claim 5 where the hydroxy-aluminum in said solution has a concentration of at least 6 molar.

7. The method of claim 6 further characterized in that said solution of hydroxy-aluminum is admixed with said clay soil in situ in said deposit.

8. The method of claim 5 where the hydroxy-aluminum has the general formula $Al(OH)_n X_{3-n}$ where n has a value of at least 2.0 and X is an anion selected from the group consisting of chloride, bromide, iodide, nitrate, sulfate and acetate.

9. The method of claim 5 where the hydroxy-aluminum has the general formula $Al(OH)_n X_{3-n}$ where n has a value of at least 2.5 and X is an anion selected from the group consisting of chloride, bromide, iodide, nitrate, sulfate and acetate.

10. The method of claim 5 where the hydroxy-aluminum content of said solution is between 6 and 10 molar.

* * * * *